Patented Sept. 20, 1927.

1,643,011

UNITED STATES PATENT OFFICE.

CHARLES B. HILL, OF GLENCOE, AND GEORGE L. TINTNER, OF CHICAGO, ILLINOIS, ASSIGNORS TO NORTHWESTERN YEAST COMPANY, OF CHICAGO, ILLINOIS, A CORPORATION OF ILLINOIS.

PROCESS FOR MAKING BREAD.

No Drawing. Application filed September 10, 1925. Serial No. 55,624.

This invention is a new process for making bread dough with dry yeast which, with the straight dough process, yields a superior leavened bread with about 50% increase in volume over that secured with compressed yeast. This new process, when used with the sponge method, yields a bread equal in all respects to that secured with compressed yeast and sponge method.

For many years, the prepared yeast market has contained two well known, distinct types of yeast, well known as "compressed yeast" and "dry yeast". In compressed yeast, the yeast is in moist condition and is, therefore, active; it remains in good condition only a few days, providing it is kept in cold storage; it ferments sponges and doughs in, what is known as, a short fermentation period.

In dry yeast, the yeast, comparatively speaking, contains very little water and requires a long fermentation period in sponges and doughs, due to the time required for the yeast to become active. Dry yeast keeps for about three months and does not require cold storage.

Prior to this invention, compressed yeast was practically the only kind used in commercial bakery trade, this because of its being constantly in active condition which permits sponges and doughs to be made with a short fermentation period.

Dry yeast has been used extensively in home baking for many years, on account of its keeping qualities and the superior bread it makes. Dry yeast has seldom been used in modern commercial bakeries, on account of the long fermentation period it requires to ferment sponges and doughs. These long fermentation periods cause the baker increased expense for time, labor, storage, equipment and working space.

Dry yeast, however, has, among others, the following advantages:

It is much more durable than compressed yeast and does not require ice-cold storage; therefore, larger stocks may be carried, the fermenting power is more uniform and shipments may be made by freight at less expense than by mail or express and to points not now supplied with compressed yeast. It works under wider ranges of temperature than compressed yeast. It gives more expansion of loaves in the oven, or "oven kick" than compressed yeast, thereby making the loaf larger, more nutritious and more attractive to the purchaser so it is desirable to provide a method which will permit its use in commercial bake shops.

In commercial bake shop methods, bread can be produced with compressed yeast, by the so-called straight dough method in approximately six hours; and by the sponge method in approximately six and three-quarters hours. Prior to this invention, bread could be produced with dry yeast by the straight dough method in about eleven hours; and, by the sponge method in approximately sixteen hours. In both cases, the dry yeast methods referred to were, in addition to the excessive time consumed over the compressed yeast method, objectionable because the doughs and sponges required constant watching and were subject at all times to deterioration through accidents arising from very slight causes,—this situation resulting, as heretofore stated, in the non-use in commercial bakery practice of dry yeast in bread making.

The object of this invention is to provide a formula and process for the satisfactory revivification of dried yeast for use in commercial baking, using nothing but the same materials ordinarily used for the production of a given quantity of bread which will result in the production of a more nutritious bread of better flavor and better volume with economy of money, time and labor to the baker and with a fermentation period for either the straight dough or sponge process subsantially the same as with compressed yeast, thus conforming to modern bake shop time schedules.

The invention consists in the discovery of a new formula and method of making bread by which dry yeast is revivified and put in active condition in a starter for use in further bread making processes, the materials used in the starter being only a part of those required in the finished bread product anyway and the character of action of said materials in the starter being such that although the starter requires about fifteen hours for preparation, it can, for practical purposes, be left to itself during that period, thus avoiding in any way increasing the labor or other costs to the commercial baker or cutting into the bake shop time schedules.

The invention further consists in the production of such a starter which, after the approximate fifteen hours required to put the yeast in active condition, may be used at once (or at any time later up to forty-eight hours, as hereinafter described) with either the sponge or straight dough methods of breadmaking, the fermentation period for the sponges or doughs being the same as when compressed yeast is used.

This invention further consists in such a formula that requires a total of materials, including the materials for the starter, the same in amount and kinds as when compressed yeast is used, except that with this formula for dry yeast about one per cent more water is used in making the dough, this extra water increasing the yield in loaves.

After the fifteen hour period required for the dry yeast in the starter to become active, the starter will make the bread on the same time schedule as when compressed yeast is used, namely, about six hours with the straight dough and six and three-quarters hours for the sponge method, whereas, when dry yeast is used in its commercial form, the time required for making bread is about 11 hours with the straight dough method and about sixteen hours with the sponge method.

With the foregoing facts in mind, the nature of the invention will be seen from the following illustrative example, which is within the scope of the invention, but to which we are not limited as to components, qualitatively or quantitatively:

*Formula.*

Into a suitable container, put 3.5 grams sucrose or glucose and 1.75 grams of an inorganic yeast food on an organic filler for base, as ammonium sulphate, $(NH_4)_2SO_4$, 2 parts; calcium phosphate, $Ca_3(PO_4)_2$, one part; calcium sulphate, $CaSO_4.2H_2O$, one part, and starch 6 parts, and 120 cubic centimeters of water at 90° Fahrenheit, and stir until materials are dissolved as much as possible. Add 3.5 grams of commercial malt extract of the quality ordinarily used in the baking trade, and stir until dissolved. Then add 7 grams of commercial dried yeast. Stir well, cover loosely and let stand (usually over night or for about 15 hours) at a temperature of 80–90 degrees Fahrenheit, with due regard for prevention from contamination with bacteria, initially and thereafter, thus completing the herein referred to "starter".

If the baker, commercial or home, does not use yeast food or malt extract in his or her bread, they may be omitted, either singly or together, as the case may be, from the starter. When this is done, the loaves require longer proofing time. When the starter has stood for the fifteen hours, it may, if desired, be strained to remove and discard the solid particles, thus improving the color and flavor of the bread, but reducing the number of bread loaves producible.

This "starter" mixture, after standing the time indicated, is used in lieu of compressed or any other yeast, in making a dough, of course, stirring it well before using. Proceed now as follows: Place in a suitable container 6.5 grams sucrose or glucose, 5¼ grams salt and 100 cubic centimeters water at such temperature that the final temperature of the dough will be 83° Fahrenheit, consideration being given to the room and flour temperatures and friction from the mixer. Place in a mixing bowl 350 grams flour and add the above yeast mixture, mixing slowly until lumps form; then add the sugar and salt solution and mix at faster speed; then add 5¼ grams lard and mix at high speed. (Note: Total mixing time is 5 minutes.) Place dough in a greased container of suitable size; cover and let rise at 83° Fahrenheit. After 145 minutes, knead the dough down; 70 minutes later, knead dough down again; 20 minutes later, knead dough down again. Now mould 18 ounces of the dough into a loaf; cover and place in proofing cabinet at 102° Fahrenheit. Let loaf rise for 1½ hours and then bake in oven at temperature of 450 degrees Fahrenheit for 30 minutes.

The above formula, if carefully carried out as indicated, will yield, as finished product, a one-pound loaf of bread with about 50% increase in volume over that secured with compressed yeast.

This formula and method does not increase the number or amounts of ingredients usually used by bakers, but gives a new way of making bread, whereby certain yeast nourishing ingredients required by bakers in their doughs or sponges, are dissolved in about one-half of the water to be used in making the bread and the dry yeast is then placed in this yeast nourishing solution and allowed to grow and revive practically without attention, under proper conditions of temperature, for about 15 hours, by which time the yeast is in active condition. Procedure, as regards the handling of all materials in bread making, is clearly seen by the following table:

|  | Standard formula for making bread with straight dough recipe with compressed yeast. | Formula of this invention for making bread with dry yeast with the straight dough process. |
|---|---|---|
| Ingredients in starter: |  |  |
| Yeast | | 7 grams dry yeast. |
| Sugar | | 3.5 grams. |
| Malt | | 3.5 grams. |
| Yeast food | | 1.75 grams. |
| Water | | 120 c. c. |
| Ingredients in dough: |  |  |
| Yeast | 7 grams compressed yeast. | Above starter. |
| Sugar | 10 grams | 6.5 grams. |
| Malt | 3.5 grams | None. |
| Yeast food | 1.75 grams | None. |
| Water | 217 c. c. | 100 c. c. |
| Flour | 350 grams | 350 grams. |
| Salt | 5.25 grams | 5.25 grams. |
| Lard | 5.25 grams | 5.25 grams. |
| Time required | | Same (aside from 15 hours starter stands). |
| Total materials required | | Same—except more water is used with formula of this invention. |

No attention required during the fifteen hours starter stands.

This "starter" method of preparing and using dry yeast has among others the following advantages:

This starter is easily made and is composed of dry yeast, in amount the same as usually used with compressed yeast, dissolved in about one-half of the water required for making the bread. To this is added certain other reviving materials which are part or all of certain ingredients ordinarily used by bakers in making bread and the amounts used in the starter are deducted from the total amounts as used in the bread; therefore, no extra ingredients are necessary.

The starter stands at a temperature of 80 to 90 degrees Fahrenheit for about 15 hours and is then ready for use. This temperature is the ordinary dough room temperature maintained by bakers and, therefore, fits in with the bakers' present working temperatures and conditions. Although this starter stands for a period of about 15 hours, there is no extra bread making labor over the compressed yeast method.

After the completed dry yeast "starter" has been revivified and fermented for 15 hours, it may, if desired, be kept in cold storage for a period up to 48 hours and then by raising its temperature to 80 to 82° F., may be used the same as freshly fermented starter.

The dough made with this dry yeast starter absorbs over one per cent more water, due to the difference in the moisture content of dry and compressed yeasts; therefore, a correspondingly larger number of loaves may be made with this formula than with compressed yeast.

On account of the materials contained in the dry yeast, the dough made by this invention is less sticky than that made with compressed yeast and easier to handle, either by machinery or by hand and requires less dusting flour, thus a saving on dusting flour and labor in handling same.

The starter of this invention used in breadmaking starts its fermentation activity slowly and increases gradually in vigor, whereas the reverse is true of compressed yeast. This produces the following advantages over bread made with compressed yeast: (1) Loaves have more "oven kick", resulting in more nutritious loaves of greater volume; (2) weaker (and correspondingly cheaper) flours may be used; (3) sponges and doughs are less liable to be over-fermented, known to the trade as "getting old".

On account of the better "oven kick", as stated in the last paragraph, in some States that do not have laws requiring loaves to be scaled at certain weights, loaves may be scaled according to volume, which would made a further saving with this formula.

The method specified for mixing the dough, in the formula of this invention, is very important, as it preserves the fermenting power of the yeast and makes for the better development of the dough, and assists in making larger and more nutritious loaves.

*Summarizing.*—The invention has the following general advantages:

1. Better-flavored bread of homemade type.
2. Better volume of loaf—more nutritious bread—appetite appeal.
3. Longer moisture retention.
4. Not necessary to store yeast in refrigerator; therefore less liable to be damaged in quality while in transit or storage.
5. A suitable supply of starter may be kept on hand at all times in the refrigerator.

Any good commercial dry yeast may be used in carrying out this invention. "Yeast foam" made by Northwestern Yeast Company, Chicago, Illinois, has been used with success.

While the invention has been made primarily on account of the commercial baking problem, it is, of course, just as applicable to home baking or any other kind or place of baking.

In support of the statement that the bread produced is more nutritious, it is pointed out that a well raised loaf of bread is more porous and digestible and a large loaf of bread indicates that the gluten has been properly conditioned and therefore the bread is more nutritious.

The word bread in the specification and claims is used to include all yeast leavened, baked goods.

The terms "malt" "malt extract" and "commercial malt extract" mean either malt flours, malt products or malt extracts in any form.

The use, generically of a composition of matter composed of ammonium sulphate, calcium sulphate, calcium phosphate, $$[Ca_3(PO_4)_2]$$

in bread making is set forth and claimed in our companion application Serial Number 160,299 filed January 10, 1927.

Having thus described our invention, what we claim as new and desire to secure by Letters Patent is:

1. The herein described method of making bread dough which consists in mixing dry yeast with a portion of the predetermined total of the yeast-nourishing materials which ultimately go into a predetermined unit of dough, allowing the mixture to stand a sufficient length of time to revivify the dry yeast and thereby produce an active starter, and then compounding such starter with the remainder of the predetermined total of materials to produce said dough.

2. The herein described method of making bread dough which consists in mixing dry yeast with a portion of the predetermined total of the yeast-nourishing materials which ultimately go into a predetermined unit of dough, allowing the mixture to stand for about fifteen hours to revivify the dry yeast and thereby produce an active starter, and then compounding such starter with the remainder of the predetermined total of materials to produce said dough.

3. The herein described method of making bread dough which consists in mixing dry yeast with a portion of the predetermined total of the yeast-nourishing materials which ultimately go into a predetermined unit of dough, allowing the mixture to stand a sufficient length of time in a temperature of 80° to 90° F. to revivify the dry yeast and thereby produce an active starter, and then compounding such starter with the remainder of the predetermined total of materials to produce said dough.

4. The herein described method of making bread dough which consists in mixing dry yeast with a portion of the predetermined total of the yeast nourishing materials which ultimately go into a predetermined unit of dough, allowing the mixture to stand about fifteen hours in a temperature of 80° to 90° F. to revivify the dry yeast and thereby produce an active starter, and then compounding such starter with the remainder of the predetermined total of materials to produce said dough.

5. The herein described method of making bread which consists in mixing dry yeast with a portion of the predetermined total of the yeast nourishing materials which ultimately go into a predetermined unit of bread, allowing the mixture to stand a sufficient length of time to revivify the dry yeast and thereby produce an active starter, then compounding such starter with the remainder of the predetermined total of materials to form said dough, allowing the dough to rise, and then kneading, proofing and baking the dough to produce the finished bread product.

6. The herein described method of making bread which consists in mixing dry yeast with a portion of the predetermined total of the yeast nourishing materials which ultimately go into a predetermined unit of bread, allowing the mixture to stand a sufficient length of time to revivify the dry yeast and thereby produce an active starter, then compounding such starter with the remainder of the predetermined total of materials to form said dough, allowing the dough to rise 145 minutes, then kneading the dough down at the termination of the rising period and at subsequent periods of 70 and 20 minutes, and then proofing and baking the dough to produce the finished bread product.

7. The herein described method of making bread dough which consists in mixing dry yeast with a portion of the predetermined total of the yeast nourishing materials from the same kind and amount of materials which, exclusive of the compressed yeast, would ultimately go into a unit of dough produced by the use of compressed yeast, allowing the mixture to stand a sufficient length of time to revivify the dry yeast and thereby produce an active starter and then compound such starter with the remainder of the materials to produce a dough.

8. The step in the process of making bread dough, which consists in adding dried yeast to a suitable solution of yeast food consisting of sugar, malt extract and yeast nourishing salts to-wit ammonium sulphate, calcium phosphate ($Ca_3(PO_4)_2$) and calcium sulphate and permitting the revivification and growth of the yeast preparatory to using the product as a starter in making bread.

In witness whereof, we have hereunto subscribed our names.

CHARLES B. HILL.
GEORGE L. TINTNER.

CERTIFICATE OF CORRECTION.

Patent No. 1,643,011.            Granted September 20, 1927, to

CHARLES B. HILL ET AL.

It is hereby certified that error appears in the printed specification of the above numbered patent requiring correction as follows: Page 4, line 7, strike out the word "our" and insert "Charles B. Hills' and Maurice H. Givens"; and that the said Letters Patent should be read with this correction therein that the same may conform to the record of the case in the Patent Office.

Signed and sealed this 8th day of November, A. D. 1927.

Seal.                      M. J. Moore,
                     Acting Commissioner of Patents.